US012262186B2

(12) United States Patent
Meyer et al.

(10) Patent No.: US 12,262,186 B2
(45) Date of Patent: Mar. 25, 2025

(54) SYSTEM AND METHOD FOR DELIVERING FULL-BANDWIDTH SOUND TO AN AUDIENCE IN AN AUDIENCE SPACE

(71) Applicant: Meyer Sound Laboratories, Incorporated, Berkeley, CA (US)

(72) Inventors: John D. Meyer, Berkeley, CA (US); Roger Schwenke, Alameda, CA (US); Miles Rogers, San Rafael, CA (US); Jon M. Arneson, Napa, CA (US)

(73) Assignee: Meyer Sound Laboratories, Incorporated, Berkeley, CA (US)

( * ) Notice: Subject to any disclaimer, the term of this patent is extended or adjusted under 35 U.S.C. 154(b) by 165 days.

(21) Appl. No.: 17/518,519

(22) Filed: Nov. 3, 2021

(65) Prior Publication Data

US 2022/0060828 A1 Feb. 24, 2022

Related U.S. Application Data

(63) Continuation of application No. PCT/US2020/032102, filed on May 8, 2020.

(Continued)

(51) Int. Cl.

*H04R 5/02* (2006.01)

*H04R 1/26* (2006.01)

(Continued)

(52) U.S. Cl.

CPC ................. *H04R 5/02* (2013.01); *H04R 1/26* (2013.01); *H04R 1/30* (2013.01); *H04R 3/14* (2013.01);

(Continued)

(58) Field of Classification Search

None

See application file for complete search history.

(56) References Cited

U.S. PATENT DOCUMENTS 5,004,067 A 4/1991 Patronis 10,524,080 B1 12/2019 Johnson et al.

(Continued)

FOREIGN PATENT DOCUMENTS

EP 3439330 B1 10/2020

OTHER PUBLICATIONS

Harman: A Samsung Company, Addressing Sound Reproduction as a System-Wide Solution to Samsung's Onyx LED Cinema Screen Technology, Dec. 2018.

(Continued)

*Primary Examiner* — Qin Zhu

(74) *Attorney, Agent, or Firm* — Beeson Skinner Beverly, LLP

(57) ABSTRACT

A system and method for delivering full-bandwidth sound to an audience in an audience space located in front of an acoustically reflective image screen such as a plasma, LCD, LED, or OLED screen. The sound delivery system provides for two separate and spatially displaced sound sources, namely, a high frequency loudspeaker for reproducing high frequency components of the sound associated with images displayed on the acoustically reflective image screen, and a separate low frequency loudspeaker for reproducing low frequency components of the image-associated sound. The high frequency loudspeaker or loudspeakers are positioned in front of the image screen to direct the high frequency components of the sound at the image screen where it is reflected back into the audience space, whereas the low frequency loudspeaker or loudspeakers are positioned at or about the acoustically reflective image screen and direct the low frequency components of the sound toward the audience space which are time-aligned with the high frequency components.

23 Claims, 7 Drawing Sheets

Related U.S. Application Data

(60) Provisional application No. 62/845,244, filed on May 8, 2019.

(51) Int. Cl.

| | |
|---|---|
| ***H04R 1/30*** | (2006.01) |
| ***H04R 3/02*** | (2006.01) |
| ***H04R 3/12*** | (2006.01) |
| ***H04R 3/14*** | (2006.01) |
| ***H04R 5/04*** | (2006.01) |
| ***H04R 9/06*** | (2006.01) |
| ***H04R 27/00*** | (2006.01) |
| ***H04S 7/00*** | (2006.01) |

(52) U.S. Cl.

CPC ............... *H04R 5/04* (2013.01); *H04R 27/00* (2013.01); *H04S 7/302* (2013.01); *H04S 7/305* (2013.01)

(56) References Cited

U.S. PATENT DOCUMENTS

| | | | | |
|---|---|---|---|---|
| 10,841,691 | B2 | 11/2020 | Congard | |
| 2005/0025318 | A1 | 2/2005 | Sadaie et al. | |
| 2006/0251271 | A1 | 11/2006 | Grimani | |
| 2007/0274541 | A1 * | 11/2007 | Uetake | G10K 15/02 381/337 |
| 2018/0242077 | A1 | 8/2018 | Smithers et al. | |
| 2020/0068294 | A1 * | 2/2020 | Slack | H04R 1/345 |
| 2021/0021929 | A1 * | 1/2021 | Slack | H04R 1/26 |

OTHER PUBLICATIONS

Harman, "CRF2 Reflector Horn for Solid Screen Cinema Specsheet," Jul. 25, 2018.

Harman, "Audio Solution for Samsung Cinema LED Presentation" (2018).

* cited by examiner

SYSTEM AND METHOD FOR DELIVERING FULL-BANDWIDTH SOUND TO AN AUDIENCE IN AN AUDIENCE SPACE

CROSS-REFERENCE TO RELATED APPLICATIONS

This application is a continuation of International (PCT) Application No. PCT/US2020/032102 filed May 8, 2020, still pending, which claims the benefit of U.S. Provisional Patent No. 62/845,244 filed May 8, 2019. The contents each of the foregoing applications are incorporated herein by reference in their entirety.

BACKGROUND

The present invention generally relates to sound systems, and more particularly to sound systems that produce sound that is spatially and contextually associated with images displayed on an image screen. The invention has particular application in cinemas where an audience sitting in front of a cinema screen views a movie, documentary or other content on the screen while hearing an associated soundtrack through loudspeakers strategically placed within the cinema space. However, it will be seen that the invention may be adapted to any application where sound associated with an image or images, whether moving or static, must be delivered to an audience—whether an audience of one or many—in such a manner that the sound appears to come from the image or the general area of the image.

There is a long history of projecting movie images onto a projection screen which reflects the images back into an audience space for the audience's viewing. Such is the typical movie house. In the typical movie house, the movie screen is substantially transparent to sound and the soundtrack associated with the movie is normally played back through loudspeakers placed behind the projection screen. Additional loudspeakers might be added to the sides of the audience space for surround sound effects, but the main sound comes from, and importantly is perceived by the audience to come from, the projection screen where the images are displayed.

With the maturing of new light emissive screen technologies, such as plasma, LCD, LED, and OLEDs, light emissive screens are becoming practical and cost effective for cinema exhibition and are seen as a viable replacement for the traditional light reflecting projection screens. (LCDs screens are sometimes referred to as "transmissive" displays as the LCD layer of the screen transmits light produced by a backlight.) These newer screen technologies have seen widespread use in such applications as home theaters and meeting and conference spaces.

However, the difficulty with light emissive screens is that they are not to any useful extent transparent to sound. This presents problems in creating the desired association of sound to image display in large screen applications. And it presents particular problems in cinema applications and meeting cinema standards for the center channel sound, which is normally achieved using behind-the-screen loudspeakers. If the loudspeakers are, for example, moved to a position above the emissive screens, the sound and particularly the high frequency components of the sound will, to the viewer, appear to come from an elevated position above the screen and not from the image on the screen. As a result the sound and image will in the mind of the viewer become disassociated from each other, an untoward viewing experience.

One purported solution to this problem has been to locate full-bandwidth front channel loudspeakers vertically above (or above and to the sides of) the emissive screen and then to "de-elevate" the sound coming from the elevated loudspeakers so that the sound appears to come from the image on the screen. The de-elevation technique relies on so-called "de-elevation filters" to provide the considerable digital signal processing needed to achieve its desired effect. To compensate for high-frequency energy taken out of the direct full frequency sound by the de-elevation process, the technique proposes to position auxiliary loudspeakers to the front of and pointed at the screen to reflect high frequency content sound off of the screen. Purportedly, the reflected high frequency sound combines with the direct sound from the loudspeakers above and adjacent the screen to overcome the loss of high frequency energy in the direct sound field. This complex de-elevation technique is reliant on heavy signal processing and is believed to be largely ineffective.

An effective solution is needed for making sound that is spatially and contextually associated with images displayed on an acoustically non-transparent light emissive image screen appear to come from the image screen, a solution that is not reliant on previously tried sound source "de-elevation" techniques.

SUMMARY OF THE INVENTION

The invention is directed to a system and method for delivering full-bandwidth sound to an audience in an audience space located in front of an acoustically reflective image screen, and particularly an acoustically reflective image screen that is relatively large. The image screen could be a light emissive screen that produces its own image such as a large plasma, LED, or OLED screen or a projection screen capable of reflecting sound at higher frequencies, for example above 500 Hz. The system and method of the invention will enable full-bandwidth sound to be delivered to the audience that is spatially and contextually associated with the images displayed on the image screen, and particularly will make it seem as if the full-bandwidth sound is coming from the image screen. The system and method of the invention replicates the experience of a traditional behind-the-screen speaker in circumstances where it is not possible to put a speaker behind the screen.

The system of the invention comprises two separate and spatially displaced sound sources, namely, a high frequency loudspeaker for receiving and reproducing high frequency components of the sound associated with the images displayed on the acoustically reflective image screen, and a separate low frequency loudspeaker for receiving and reproducing low frequency components of the image-associated sound. A cross-over splits a full-bandwidth audio input signal into high and low frequency components for driving the high frequency loudspeaker and the low frequency loudspeaker. It is contemplated that in most implementations of the invention more than one high frequency loudspeaker and more than one low frequency loudspeaker will be used, however, the invention is not intended to be limited to the use of any particular number of high or low frequency loudspeakers. Reference herein to a loudspeaker in the singular will be understood to include the possibility of plural loudspeakers.

In accordance with the invention, the high frequency loudspeaker is positioned in front of the acoustically reflective image screen and angled toward the image screen such that the sound emitted by the high frequency loudspeaker in response to the audio signal input is reflected off of the image screen. The high frequency loudspeaker will have a polar pattern meeting the following criteria: the polar pattern is large enough that sound from the high frequency loudspeaker that is reflected from the image screen covers the audience space yet is small enough that direct sound from the high frequency loudspeaker does not extend into the audience space. The system is configured such that substantially the entirety of the high frequency components of the sound received by the audience is reflected sound supplied by the high frequency loudspeaker(s) of the system. The low frequency loudspeaker is, on the other hand, positioned at or about the acoustically reflective image screen and is directed such that low frequency sound produced by the low frequency loudspeaker in response to the audio signal input is received by the audience as direct sound from the low frequency loudspeaker. Thus, the audience's audio experience related to the image or images on the image screen is determined by the combining of the high frequency components of the sound reflected from the image screen with the low frequency components of the sound received directly from the low frequency loudspeaker as that combined sound reaches the audience. The cross-over from the low frequency to the high frequency components of the sound will preferably be in a range of about 350 to about 1000 Hz, however, it is contemplated that cross-over could occur as low as about 150 Hz and as high as 1500 Hz.

To compensate for differences in length of the acoustical paths over which the reflected and direct components of sound must travel to reach the audience, a signal delay is placed in front of the low frequency loudspeaker. This delay will time-align the direct sound from the low frequency loudspeaker arriving at the audience space with the arrival of sound from the high frequency loudspeaker that is reflected from the display screen.

Preferably, the high frequency loudspeaker will be located at a distance in front of the image screen no greater than the distance the audience is from the display screen, and preferably at a distance that approximately corresponds to the front row of the audience. This placement of the high frequency loudspeaker will avoid the risk that any portion of the audience would hear both reflected and direct sound from the high frequency loudspeaker.

In accordance with the method of the invention, full-bandwidth sound is delivered to an audience in an audience space located in front of an acoustically reflective image screen that displays one or more static or moving images viewed by the audience. Full-bandwidth sound delivered to the audience is spatially and contextually associated with the images displayed on the image screen. From a position in front of the image screen, the high frequency components of the sound associated with the images displayed on the acoustically reflective image screen are directed at the image screen such that high frequency components of the sound arrive at the audience as reflected sound only. From a different position, namely, at or about the acoustically reflective image screen, low frequency components of the sound associated with the images on the acoustically reflective image screen are directed at the audience such that the low frequency components of the sound arrive at the audience not as reflected sound but as direct sound, that is, as sound travelling directly to the audience from its source. To time-align these two components of the full-bandwidth sound when they combine and arrive at the audience, the low frequency component of the full-bandwidth sound is delayed relative to the high frequency component of the full-bandwidth sound. The combined and time-aligned frequency components of the full-bandwidth sound are perceived by the listener as coming from a single source spatially located in the area of the screen.

Thus, the system and method of the invention solves the problem of creating a desired sound experience associated with image displays, such as movies or video presentations, where the image screens are not transparent to sound, thus preventing the deployment of loudspeakers behind the screens. The desired sound experience is achieved without the difficulties associated with "de-elevating" or otherwise re-locating the perceived source of the sound where direct sources pointed at the audience are used.

It will be understood that implementations of the invention do not preclude the possible use of additional surround loudspeakers the produce off-screen sound, the source of which is not tied to an image on the image screen.

DESCRIPTION OF THE ILLUSTRATED EMBODIMENTS

The embodiments of the invention illustrated in the accompanying drawings show the implementation of the invention in an audience space such as a movie house with a light emissive image screen (image screen). However, it will be understood that the invention is not limited to the video display of images. For instance, a museum might use a loudspeaker system in accordance with the invention to associate sound with a static image or diorama to make it appear that the sound is coming from the image or diorama. What is required is a surface that will reflect high frequency acoustic energy to a sufficient extent that this component of the desired broader bandwidth sound can be heard with reasonable clarity by an audience located in front of the surface. The surface acts as an image screen. Thus, as used herein, "image screen" shall mean any surface on which a moving or static image or images can be displayed either by projecting the images onto the surface or by producing images on the surface through any light emission technology, currently known or unknown.

Figure 1:
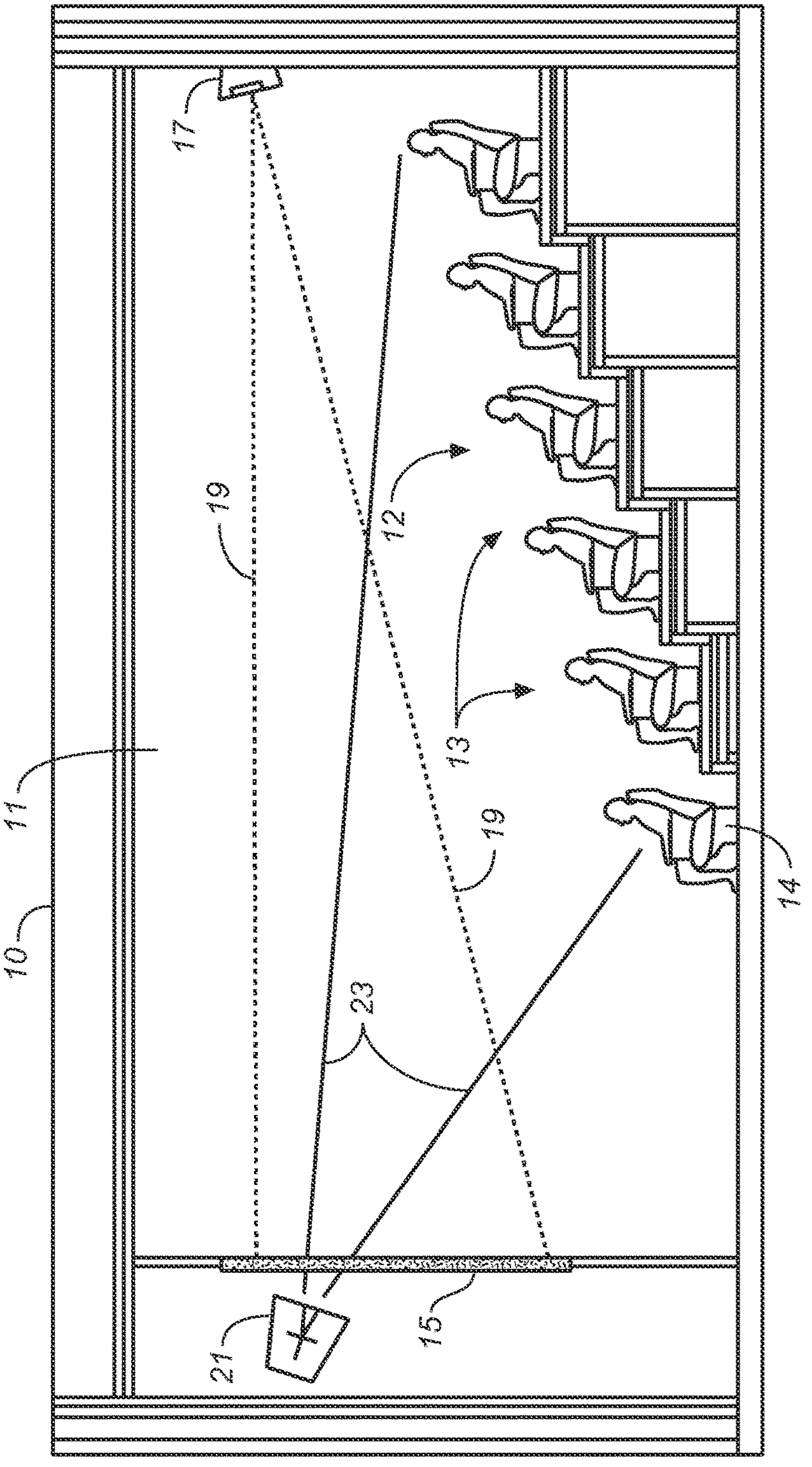
FIG. 1 (PRIOR ART)
FIG. 1 is an elevational view of an exhibition room, such as a movie house, with a conventional sound-transparent movie screen and a loudspeaker behind the movie screen such that the audience receives the full bandwidth sound as direct sound.

Referring now to the drawings, FIG. 1 shows a building 10 with an exhibition room 11 having an audience space 12 with an audience 13 seated in the audience space. FIG. 1 is representative of a movie house or meeting room in which there is a conventional sound transparent projection screen 15 onto which an image, such as a movie image, is projected by a projector 17 behind the audience as depicted by dashed projection light cone lines 19. A loudspeaker 21, in this case a full range loudspeaker, is positioned behind the sound transparent image screen and pointed toward the audience. The sound emitted from this behind-the-screen loudspeaker is emitted in a coverage (polar) pattern depicted by solid sound cone lines 23, and it is seen that the coverage pattern is broad enough to cover the entire audience, including the front row 14 of the audience. In this conventional sound system design, the sound heard by the audience comes from behind the projection screen. As a consequence, the sound system achieves the desired result of having the sound spatially associated with the images on the screen.

It is noted that in FIG. 1, as in the following figures, the audience seating arrangement is a representative arrangement only for illustrative purposes. Seating arrangements can vary widely in configuration and size and can include balcony spaces. The loudspeaker selection and deployment would require that these different audience seating configurations and audience sizes be taken into account. Ideally, the loudspeaker system design will provide uniform coverage over the entire audience space.

FIGS. 2-5 illustrate a building 10 with an exhibition room 11 similar to the exhibition room shown in FIG. 1, however, in this exhibition room, instead of a sound transparent projection screen there is an image screen in the form of image screen 25 which is not transparent to sound but rather reflects sound. Because the image screen provides no or little sound transparency, a sound system capable of spatially associating full-bandwidth sound with the images on the screen viewed by the audience 13 cannot rely on loudspeakers placed behind the image screen.

In FIGS. 2-5, the solution provided by the present invention is illustrated. As shown in these figures, two separate loudspeakers 27, 29 (which can also be referred to as "transducers" or "drivers") are physically displaced from each other, one at a distance in front of the image screen 25 and the other in the vicinity of the image screen. Neither is placed behind the image screen. The first of these two separate loudspeakers, the one denoted by the numeral 27 and which is positioned in front of the image screen, is a high frequency loudspeaker, sometimes referred to herein as a "high loudspeaker." This loudspeaker reproduces the high frequency component of the audio programming for the images displayed on the image screen and is angled toward the image screen such that the image screen, which again is acoustically reflective, reflects the high frequency component of the sound coming from this loudspeaker back to the audience.

FIGS. 2-5 illustrate how the deployment of the high frequency loudspeaker in front of the image screen is tantamount to having a high frequency loudspeaker at the same height and distance behind the image screen. This can be referred to as a "virtual" loudspeaker as it does not physically exist but rather illustrates how the coverage of a loudspeaker placed behind a conventional sound transparent image screen can be replicated from a loudspeaker in front of an image screen that is not transparent to sound.

The virtual loudspeaker is depicted in FIGS. 2-5 by the dashed-line phantom loudspeaker 27*p*. The coverage of the real loudspeaker 27 is represented by solid lines 31*a*, 31*b*, where lines 31*a* represent the travel of direct sound from loudspeaker 27 to the image screen and lines 31*b* represent the travel of the sound reflected from the image screen to the audience. The coverage of the sound travelling from the virtual loudspeaker 27*p* behind the image screen is represented by dashed lines 33 behind the screen and solid lines 31*b* to the front of the screen. It is seen that in front of the image screen the coverage provided by the virtual loudspeaker 27*p* is equivalent to the coverage provided by real loudspeaker 27. It is also seen that the sound received by the audience from loudspeaker 27 is reflected sound only; there are no high frequency sound loudspeakers relocated from behind the image screen that direct sound directly to the audience. As will be further discussed below, it is important that the high frequency loudspeaker be directional and have a polar pattern that conforms to certain limitations to achieve a desired coverage.

Figure 2:
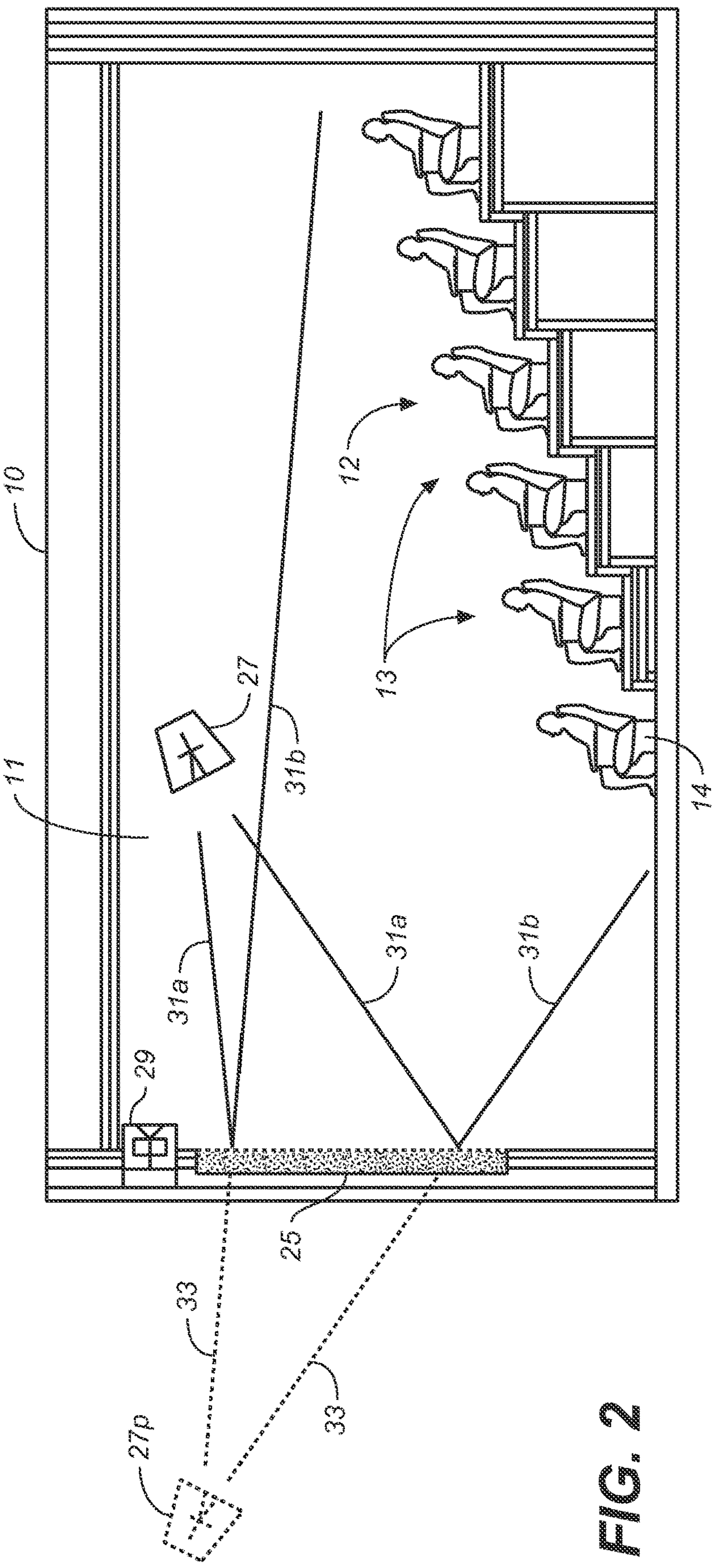
FIG. 2 is an elevational view of an exhibition room such as shown in FIG. 1 with an acoustically reflective image screen and an exemplary vertical plane deployment of separate high frequency and low frequency loudspeakers in accordance with the invention.

The second of the two required loudspeakers, denoted by the numeral 29, is a low frequency loudspeaker (sometimes referred to herein as a "low loudspeaker"). This loudspeaker reproduces low frequency components of the audio programming for the images displayed on the image screen. As seen in FIG. 2, it is positioned directly above the image screen and pointed outwardly toward the audience so that the audience receives sound from this loudspeaker directly from the speaker. Loudspeaker 29 will excite room reverberations as would a low frequency loudspeaker speaker positioned behind a video projection screen. Because the human ear has difficulty in locating the source of low frequencies, the low frequency components of the audio programming for the images can readily be associated with the screen images despite that fact that the loudspeaker is not located directly behind the display screen.

Figure 3:
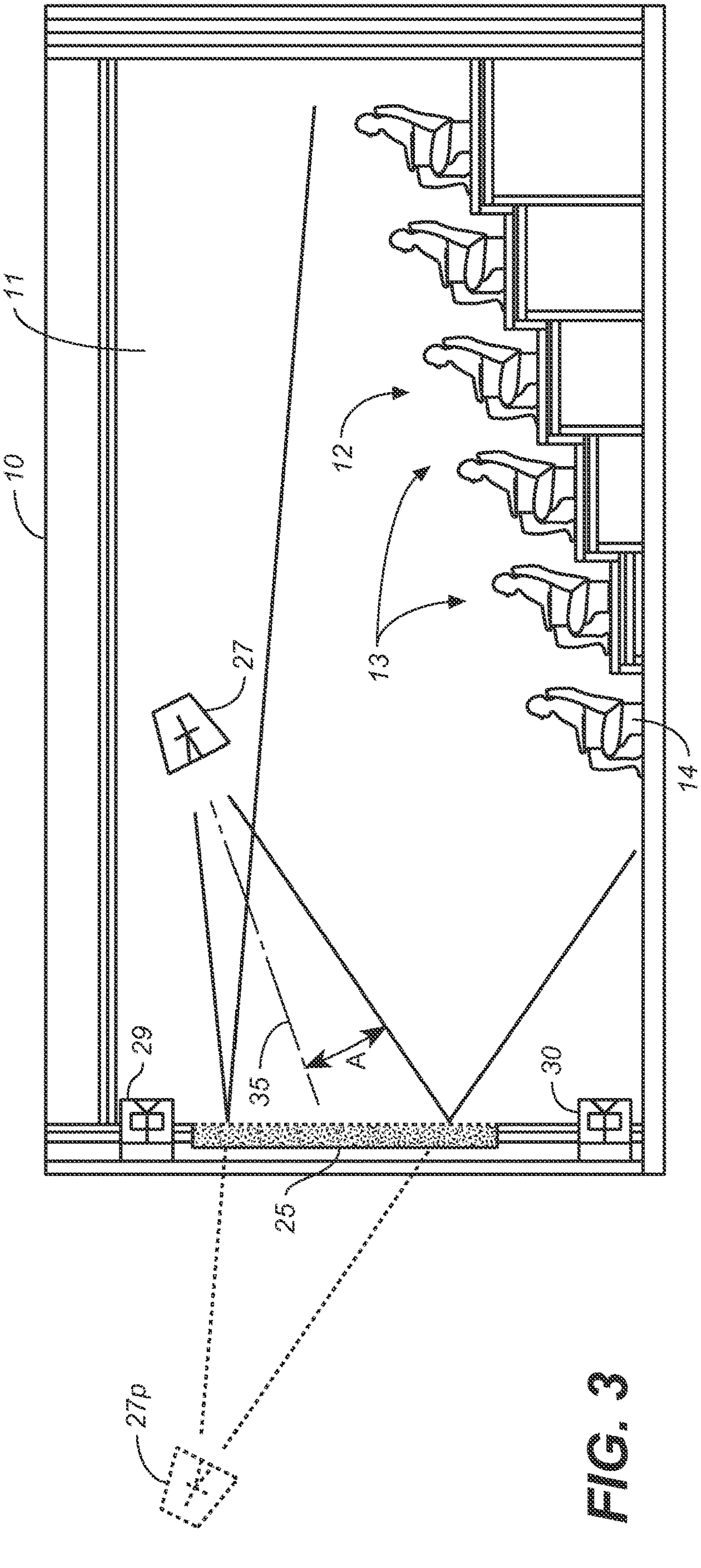
FIG. 3 is the same elevational view thereof showing an alternative vertical plane deployment of the low frequency loudspeaker.
Figure 4:
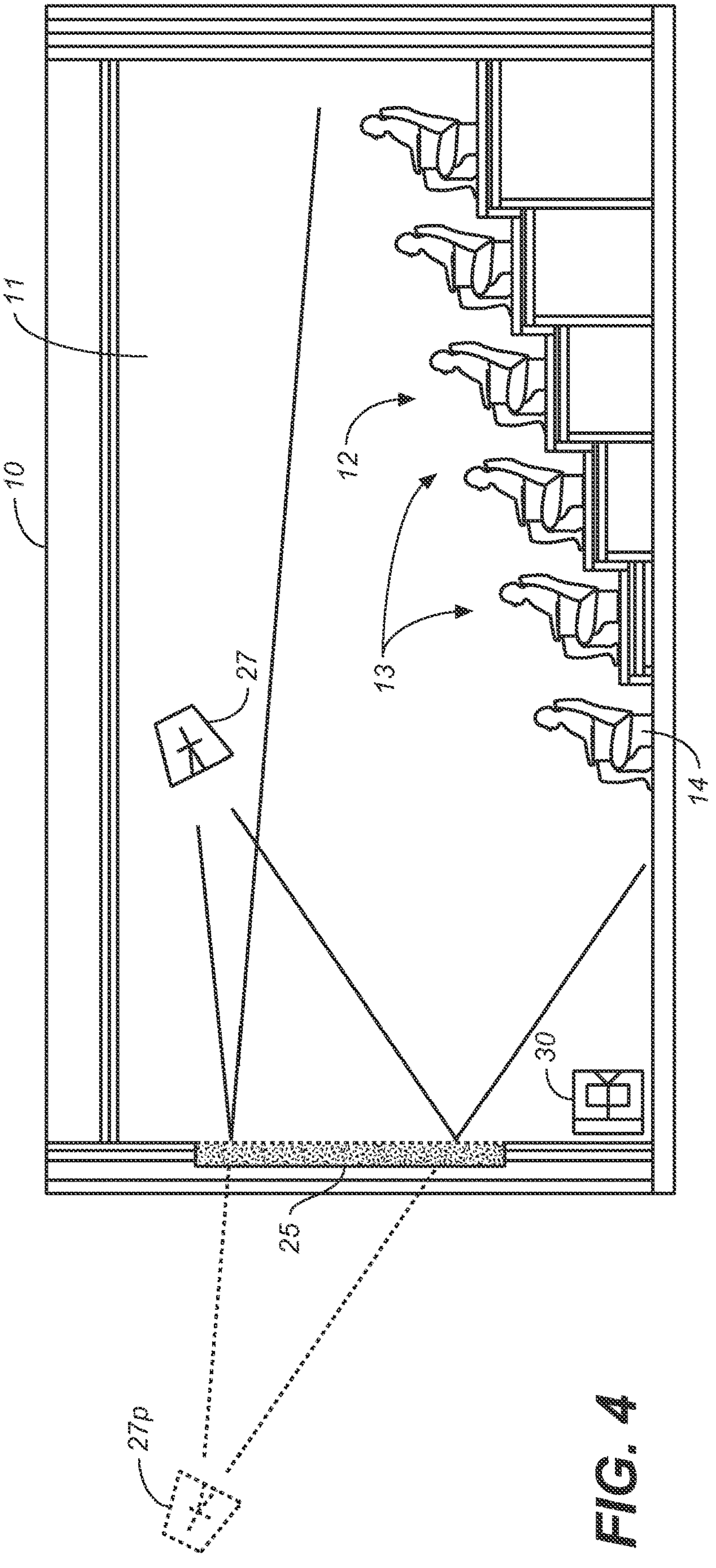
FIG. 4 is the same elevational view thereof showing an exemplary vertical plane deployment of two low frequency loudspeakers instead of one low frequency loudspeaker.
Figure 5:
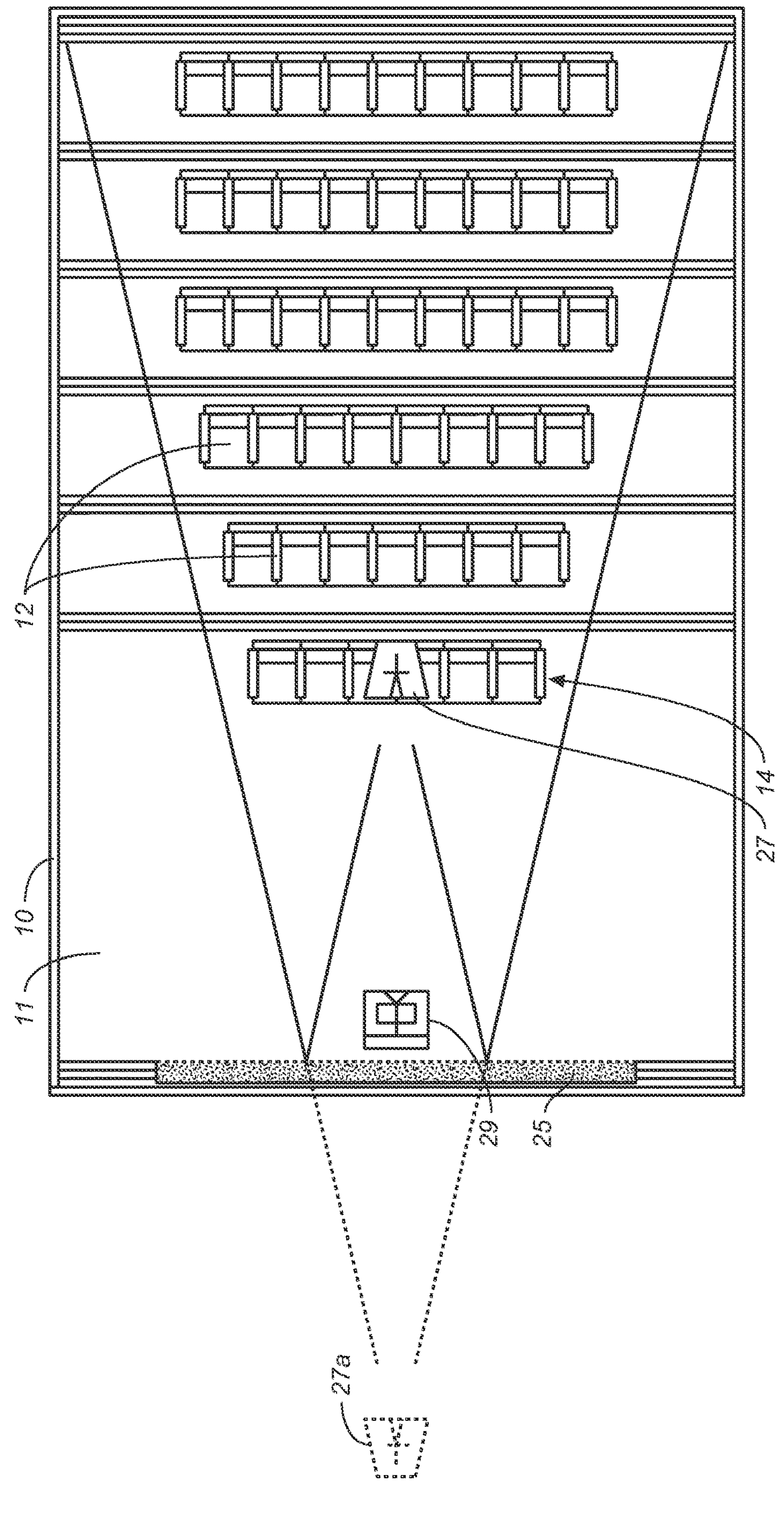
FIG. 5 is a plan view of an exhibition room such as illustrated in FIGS. 2-4 showing the deployment of a single center channel high frequency loudspeaker and a single center channel low frequency loudspeaker in the horizontal plane.

It will be appreciated that the low frequency loudspeaker or loudspeakers can be deployed in positions other than the location shown in FIG. 2. Exemplary alternatives for deployment of the low frequency loudspeakers are shown in FIGS. 3-4, where FIG. 3 shows two low frequency loudspeakers, one (loudspeaker 29) deployed above the image screen as in the low loudspeaker deployment illustrated in FIG. 2, and the other (loudspeaker 30) deployed below the image screen. FIG. 4 illustrates a deployment consisting of a single low frequency loudspeaker 30 below the image screen. Any number of low frequency loudspeakers can be deployed in the general vicinity of the image screen for the purpose of producing the direct low frequency sound heard by the audience.

As above-mentioned, apart from its location and pointing angle, the high frequency loudspeaker 27 must be directional. Within its operating frequency range, its directivity in both the vertical and horizontal planes should be wide enough that the sound reflected from the image screen covers the audience. But its vertical directivity must not be so wide as to extend into the audience space, as exposure to the direct sound in addition to the reflected sound would be a highly distracting and unpleasant experience to anyone in the audience. The cut-off angle denoted "A" in FIG. 3 is seen to satisfy this requirement. Ideally, the SPL levels of the sound produced by the high loudspeaker will decrease rapidly at this cut-off angle. It also should not produce side lobes of any significance that would cause any significant amount of direct sound to leak into the audience space.

The distance at which the high frequency loudspeaker is positioned in front of the screen is a consideration in achieving the above-described objectives. Generally, the high loudspeaker cannot be too close to the screen as it would become difficult to achieve desired coverage of the audience and the speaker might visually obstruct sight lines to the image screen. On the other hand, locating the high loudspeaker too far from the screen risks placing portions of the audience within the direct radiation pattern of the loudspeaker. Preferably, the high loudspeaker will be located at a distance in front of the image screen that approximately corresponds to the front row 14 of the audience 13 as shown in FIGS. 2-6; however, with suitable directionality and the absence of significant side lobes, it could be located behind this position.

Wherever positioned, both the vertical and horizontal directivity of the high frequency loudspeaker used in the system and method of the invention will normally be narrower than the vertical and horizontal directivity of a traditional behind-the-screen speaker. This is because the distance the sound from the high loudspeaker 27 must travel to reach the audience is substantially longer than a direct path taken by sound produced by a behind-the-screen loudspeaker. The needed directivity can be achieved with commercially available horn loudspeakers or by direct radiator line arrays where the directivity is achieved using signal processing instead of with a horn.

The needed directivity, however, cannot be achieved at low frequencies. Typically, it is impractical to achieve meaningful directivity from a loudspeaker at frequencies much below 500 Hz. Providing spatially separated high and low frequency sound sources as described herein provides a solution to this problem. In implementing the system and method of the invention, the cross-over between the high and low loudspeakers 27, 29 can, within limits, occur above and below 500 Hz. Preferably, cross-over will occur somewhere within the range of about 350 Hz to about 1000 Hz, however, it is contemplated that an effective system could be implemented with cross-over occurring as low as 150 Hz and as high as 1500 Hz.

Finally, the invention provides for delaying the sound produced by the low frequency transducer in order to time-align the sound coming from the low frequency loudspeaker 29 with the sound coming high frequency loudspeaker 27, the latter of which has a longer path to travel before it reaches the audience. Magnitude and phase equalization can be applied to the signal inputs for the low and high loudspeakers so that they sum in phase in the range of the cross-over frequencies. Additionally, magnitude and phase equalization may be applied to the overall signal to account for boundary loading to synchronize the sound to the video, and for other purposes.

Figure 6:
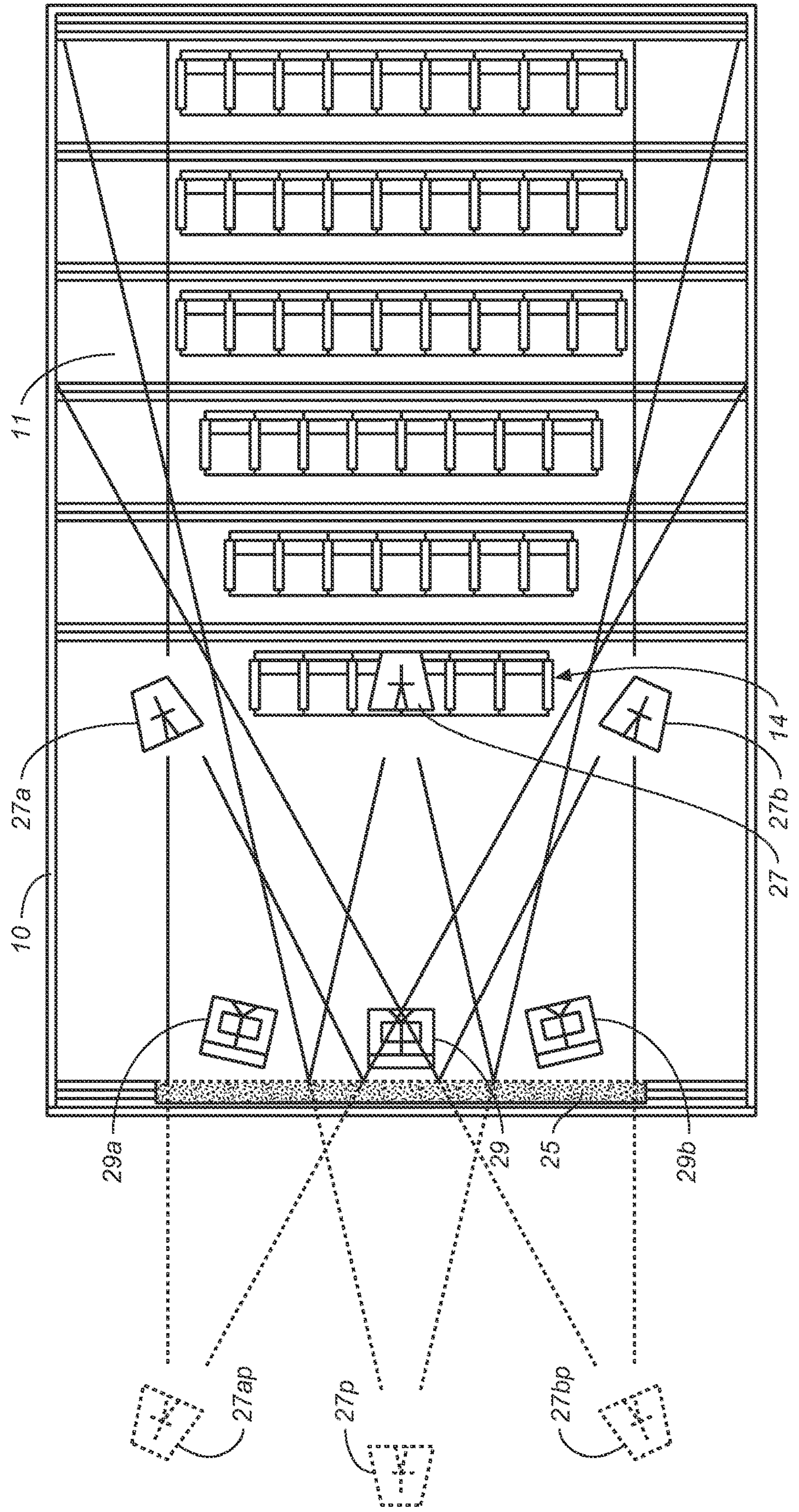
FIG. 6 is a plan view of an exhibition room such as shown in FIGS. 2-5 illustrating an exemplary horizontal plane deployment of three high frequency and three low frequency loudspeakers in accordance with the invention.

FIG. 6 illustrates a system in accordance with the invention viewed in the horizonal plane, which is comprised of three high frequency, directional loudspeakers deployed in front of image screen 25, namely, center channel high loudspeaker 27 and left and right channel loudspeakers 27*a* and 27*b*. The criteria for the deployment and directional characteristics of these three high frequency loudspeakers, which can be represented by their virtual cousins 27*p*, 27*ap* and 27*bp*, is the same as described above in connection with a system having only a single high frequency loudspeaker. See FIGS. 2-5. The system illustrated in FIG. 6 is also seen to have three low frequency loudspeakers 29, 29*a*, 29*b*, which are deployed in the vicinity of the image screen. As in the exemplary systems shown in FIGS. 2-5, the low loudspeakers that face the audience can be positioned above or below the image screen or both above and below the image screen. They could also be positioned elsewhere anywhere around the image screen.

Figure 7:
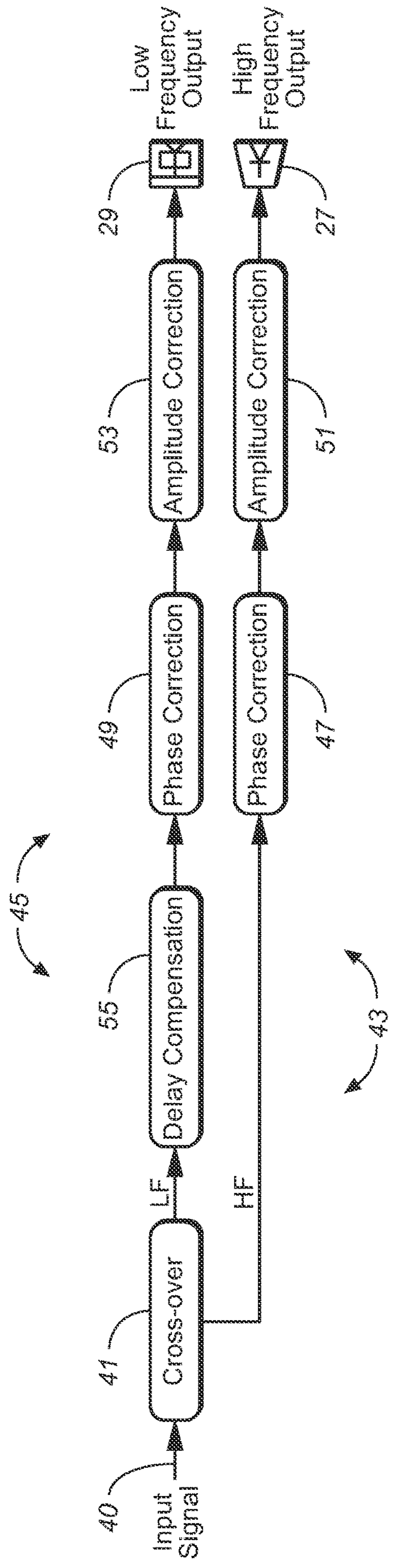
FIG. 7 is a block diagram for an exemplary implementation of signal processing for the audio signals that drive the separate high and low frequency loudspeakers in accordance with the system and method of the invention.

FIG. 7 shows an exemplary implementation of the signal processing that can be used in connection with the system and method of the invention. Shown is an audio input signal 40 being passed through a cross-over 41, which splits the audio input into low and high frequency components. The high frequency component is sent to the high frequency loudspeaker 27 as a high audio signal input via high frequency channel 43 while the low frequency component is sent to the low frequency loudspeaker 29 as a low audio signal input via low frequency channel 45. Each of these channels suitably contains its own phase and amplitude correction, as represented by the phase correction blocks 47, 49 and amplitude correction blocks 51, 53. In addition, the signal processing in the low frequency channel provides a delay function wherein the low audio signal input to low frequency loudspeaker 29 is delayed relative to the high audio signal input to the high frequency loudspeaker 27. The delay compensation in the low channel, which is represented in FIG. 7 by block 55, corrects for the longer path the sound from the high loudspeaker has to travel to reach the audience, as described above.

It will be appreciated that the functions of the signal processing illustrated in FIG. 7 can be implemented in a variety of different ways using analog circuits or digital signal processing. Implementation of the circuit blocks illustrated in FIG. 7 can be achieved with known circuit design and/or digital filters by persons of ordinary skill in the art.

While the system and method of the invention has been described in considerable detail in the foregoing specification and accompanying drawings, it is not intended that the invention be limited to such detail. It will be readily apparent to persons of ordinary skill in the art that variations of the described embodiments are possible without departing from the spirit and scope of the invention as reflected in the following claims. Nor is the system and method of the invention intended to be limited the application described herein. Other applications, whether currently known or unknown, are or in the future may be possible, again without departing from the spirit and scope of the invention as reflected in the following claims.

We claim:

1. A system for delivering full-bandwidth sound to an audience in an audience space located in front of an acoustically reflective image screen, wherein the acoustically reflective image screen displays one or more static or moving images viewed by the audience and wherein the full-bandwidth sound delivered to the audience is spatially and contextually associated with the images displayed on the image screen, the system comprising:

one or more high frequency loudspeakers for reproducing high frequency components of the sound associated with the images displayed on the acoustically reflective image screen, one or more low frequency loudspeakers reproducing low frequency components of the sound associated with the images on the acoustically reflective image screen, a cross-over for splitting a full-bandwidth audio input signal into high and low audio signal inputs for, respectively, the one or more high frequency loudspeakers and one or more low frequency loudspeakers, the one or more high frequency loudspeakers being positioned in front of the acoustically reflective image screen and being angled toward the image screen such that the sound emitted by the high frequency loudspeaker in response to the high audio signal input is reflected off of the image screen, the one or more high frequency loudspeakers each having a polar pattern meeting the following criteria: the polar pattern is large enough in the horizonal direction that sound from the one or more high frequency loudspeakers that is reflected from the image screen covers the audience space, yet is small enough in the vertical direction that direct sound from the high frequency loudspeaker does not extend into the audience space, and wherein substantially the entirety of the high frequency components of the sound produced by the one or more high frequency loudspeakers that are associated with the images displayed on the acoustically reflective image screen arrive at the audience space as reflected sound, and further wherein only high frequency sound produced by the one or more high frequency loudspeakers associated with the images displayed on the acoustically reflective image screen reaches the audience space, the one or more low frequency loudspeakers being positioned and directed such that low frequency sound produced by the one or more low frequency loudspeakers in response to the low audio signal input is received by the audience as direct sound, and delay compensation in front of the one or more low frequency loudspeakers for delaying the sound produced by the one or more low frequency loudspeakers relative to the sound produced by the one or more high frequency loudspeakers to time-align the direct sound from the one or more low frequency loudspeakers arriving at the audience space with the arrival of sound produced by the one or more high frequency loudspeakers that is reflected from the display screen.

2. The system of claim 1 wherein the crossover between the high and low audio signal inputs for the one or more high frequency loudspeakers and the one or more low frequency loudspeakers occurs between about 150 Hz and about 1500 Hz.

3. The system of claim 1 wherein the crossover between the high and low audio signal inputs for the one or more high frequency loudspeakers and the one or more low frequency loudspeakers occurs between about 350 Hz and about 1000 Hz.

4. The system of claim 1 wherein the one or more high frequency loudspeakers are horn loudspeakers having a polar pattern that meets the polar pattern criteria recited in claim 1.

5. The system of claim 1 wherein the one or more high frequency loudspeakers are line array loudspeakers having a polar pattern that meets the polar pattern criteria recited in claim 1.

6. The system of claim 1 wherein the one or more high frequency loudspeakers are positioned in front of the acoustically reflective image screen at a distance that is approximately no greater than the distance the front of the audience space is from the display screen.

7. The system of claim 1 wherein at least one of the one or more low frequency loudspeakers is positioned above the display screen pointing toward the audience space.

8. The system of claim 1 wherein at least one of the one or more low frequency loudspeakers is positioned below the display screen pointing toward the audience space.

9. The system of claim 1 wherein at least one of the one or more low frequency loudspeakers is positioned behind an opening in the display screen pointing toward the audience space.

10. A system for delivering full-bandwidth sound to an audience in an audience space located in front of an acoustically reflective image screen, wherein the acoustically reflective image screen displays images viewed by the audience and wherein the full-bandwidth sound delivered to the audience is spatially and contextually associated with the images displayed on the image screen, the system comprising:

one or more directional high frequency sound sources positioned in front of the acoustically reflective image screen and pointed toward the image screen such that the sound emitted by the one or more high frequency sound sources in response to a high frequency audio signal input is reflected off of the image screen, the one or more directional high frequency sound sources being positioned in front of the acoustically reflective image screen relative to the audience and configured such that sound emitted by the one or more directional high frequency sound sources does not extend vertically down into the audience space and yet sound emitted by the one or more directional high frequency sound sources extends sufficiently in a horizontal pattern to cover the audience space, and wherein substantially the entirety of the high frequency sound arriving at the audience space that is associated with the images displayed on the image screen results from reflected sound produced by the one or more directional high frequency sound sources, one or more low frequency sound sources positioned at or about the acoustically reflective image screen and pointed toward the audience space such that the sound emitted by the one or more low frequency sound sources in response to a low frequency audio signal input is received by the audience as direct sound from the one or more low frequency sound sources, the low frequency emitted by the one or more low frequency sound sources providing the only low frequency sound associated with the images displayed on the image to the audience space, and signal delay means for delaying the sound produced by the one or more low frequency sound sources relative to the sound produced by the one or more directional high frequency sound sources to time-align the direct sound from the one or more low frequency sound sources arriving at the audience space with the arrival of sound produced by the one or more directional high frequency sound sources that is reflected from the display screen.

11. The system of claim 10 wherein a crossover between the high and low inputs for the one or more high frequency sound sources and the one or more low frequency sound sources occurs between about 150 Hz and about 1500 Hz.

12. The system of claim 10 wherein a crossover between the high and low inputs for the one or more high frequency sound sources and the one or more low frequency sound sources occurs between 350 Hz and 1000 Hz.

13. The system of claim 10 wherein all of the high frequency sound sources are positioned in front of the acoustically reflective image screen at a distance that is approximately no greater than the distance the audience is from the image screen.

14. A method for delivering full-bandwidth sound having high frequency components to an audience in an audience space located in front of an acoustically reflective image screen, wherein the acoustically reflective image screen displays one or more static or moving images viewed by the audience and wherein the full-bandwidth sound delivered to the audience is spatially and contextually associated with the images displayed on the image screen, the method comprising:

from a position in front of the image screen, directing the high frequency components of the sound associated with the images displayed on the acoustically reflective image screen at the image screen in a polar pattern that is large enough in the horizonal direction to cover the audience space, yet is small enough in the vertical direction to prevent the high frequency components of the sound associated with the images displayed on the acoustically reflective image screen from extending into the audience space, wherein the high frequency components of the sound associated with the images on the acoustically reflective image screen arrive at the audience space almost entirely as reflected sound, and further wherein only high frequency sound associated with the images displayed on the acoustically reflective image screen reaches the audience space, from a position at or about the acoustically reflective image screen, directing low frequency components of the sound associated with the images on the acoustically reflective image screen to the audience space such that the low frequency components of the sound arrive at the audience as direct sound, and delaying the low frequency component of the full-bandwidth sound relative to the high frequency component of the full-bandwidth sound to time-align these two components of the full-bandwidth sound when they combine and are delivered to the audience.

15. The method of claim 14 wherein the high frequency components of the sound associated with the images displayed on the acoustically reflective image screen are directed at the image screen from a position that is approximately no greater than the distance the audience is from the image screen.

16. The method of claim 14 wherein a crossover between the high and low inputs for the high frequency loudspeaker and the low frequency loudspeaker occurs between 350 Hz and 1000 Hz.

17. The method of claim 14 wherein the high frequency components of the sound associated with the images displayed on the acoustically reflective image screen are directed at the image screen in a polar pattern meeting the following criteria: the polar pattern is large enough that sound that is reflected from the image screen covers the audience space, yet is small enough that no audible sound containing the high frequency components of the sound associated with the displayed images extends into the audience space.

18. The method of claim 14 wherein the high frequency components of the sound associated with the images displayed on the acoustically reflective image screen are supplied by one or more directional high frequency loudspeakers.

19. A method for delivering full-bandwidth sound having high frequency components to an audience in an audience space located in front of an acoustically reflective image screen, wherein the acoustically reflective image screen displays one or more static or moving images viewed by the audience and wherein the full-bandwidth sound delivered to the audience is spatially and contextually associated with the images displayed on the image screen, the method comprising:

reflecting the high frequency components of the sound associated with the images displayed on the acoustically reflective image screen off of the image screen and into the audience space such that the high frequency components of the sound perceived by the audience is substantially entirely the result of sound reflected off of the image screen, wherein the reflected sound extends into the audience space in a polar pattern that is large enough in the horizonal direction to cover the audience space, and preventing the high frequency components of the sound associated with the images displayed on the acoustically reflective image screen from extending into the audience space, directing the low frequency components of the sound associated with the images displayed on the acoustically reflective image screen directly into the audience space such that the low frequency components of the sound perceived by the audience is the result of sound directed directly into the audience space, preventing low frequency components of sound associated with the images displayed on the acoustically reflective image screen from extending into the audience space as reflected sound, and time-aligning the low frequency component of the full-bandwidth sound with the high frequency component of the full-bandwidth sound.

20. The method of claim 19 wherein the high frequency components of the sound associated with the images displayed on the acoustically reflective image screen that are reflected off of the acoustically reflective image screen are directed at the image screen from a distance that is approximately no greater than the distance the front of the audience space is from the image screen.

21. The method of claim 19 wherein the low frequency components of the sound associated with the images displayed on the acoustically reflective image screen are directed at the audience space from a position that is in the vicinity of the display screen.

22. The method of claim 19 wherein the low frequency components of the sound associated with the images displayed on the acoustically reflective image screen are directed at the audience space from one or more positions above the display screen.

23. The method of claim 19 wherein the low frequency components of the sound associated with the images displayed on the acoustically reflective image screen are directed at the audience space from one or more positions below the display screen.

* * * * *